United States Patent
Stanley et al.

(10) Patent No.: US 6,190,110 B1
(45) Date of Patent: Feb. 20, 2001

(54) RESIDUAL MAIL DETECTION AND CONTAINER ALIGNMENT VERIFICATION AND METHOD

(75) Inventors: R. Joe Stanley, Florissant; Gary Waldman, St. Louis; Gregory Hobson, St. Charles; John R. Wootton, St. Louis, all of MO (US)

(73) Assignee: Systems & Electronics, Inc., St. Louis, MO (US)

( * ) Notice: Under 35 U.S.C. 154(b), the term of this patent shall be extended for 0 days.

(21) Appl. No.: 09/407,207

(22) Filed: Sep. 28, 1999

(51) Int. Cl.[7] .................... B65G 65/23; B65G 65/30
(52) U.S. Cl. ............ 414/403; 414/403; 414/419; 414/421; 414/810; 250/221
(58) Field of Search .................. 414/403, 404, 414/419, 420, 421, 810, 811, 274; 250/221

(56) References Cited

U.S. PATENT DOCUMENTS 5,610,584 * 3/1997 Schrade ........................ 340/568
5,801,764 * 9/1998 Koizumi et al. ................ 348/125

FOREIGN PATENT DOCUMENTS

19509631 * 9/1996 (DE) .
562688 * 9/1993 (EP) ..................... 414/403

* cited by examiner

Primary Examiner—Steven A. Bratlie
(74) Attorney, Agent, or Firm—Polster, Lieder, Woodruff & Lucchesi, L.C.

(57) ABSTRACT

A bulk mail processing system (10) conveys bulk mail containers (C) from a receiving station (R) at which the container is placed on a conveyor (12) to an unloading station (D) at which the contents of the container are dumped. A video camera (22) obtains an image of the container which is transmitted to a processor (24). The image is processed to determine if residual mail (M) is left in the container after it is emptied. A mechanism (18) removes the container from the conveyor, empties the container, and then returns the container back to the conveyor. A controller (20) controls operation of the emptying mechanism. The controller is responsive to an input from the processor that all the contents of a container have been removed to replace the empty container on the conveyor. The controller is further responsive to an input from the processor that there is residual mail left in the container to have the mechanism re-empty the container and so insure container is completely empty before being returned to the conveyor.

31 Claims, 4 Drawing Sheets

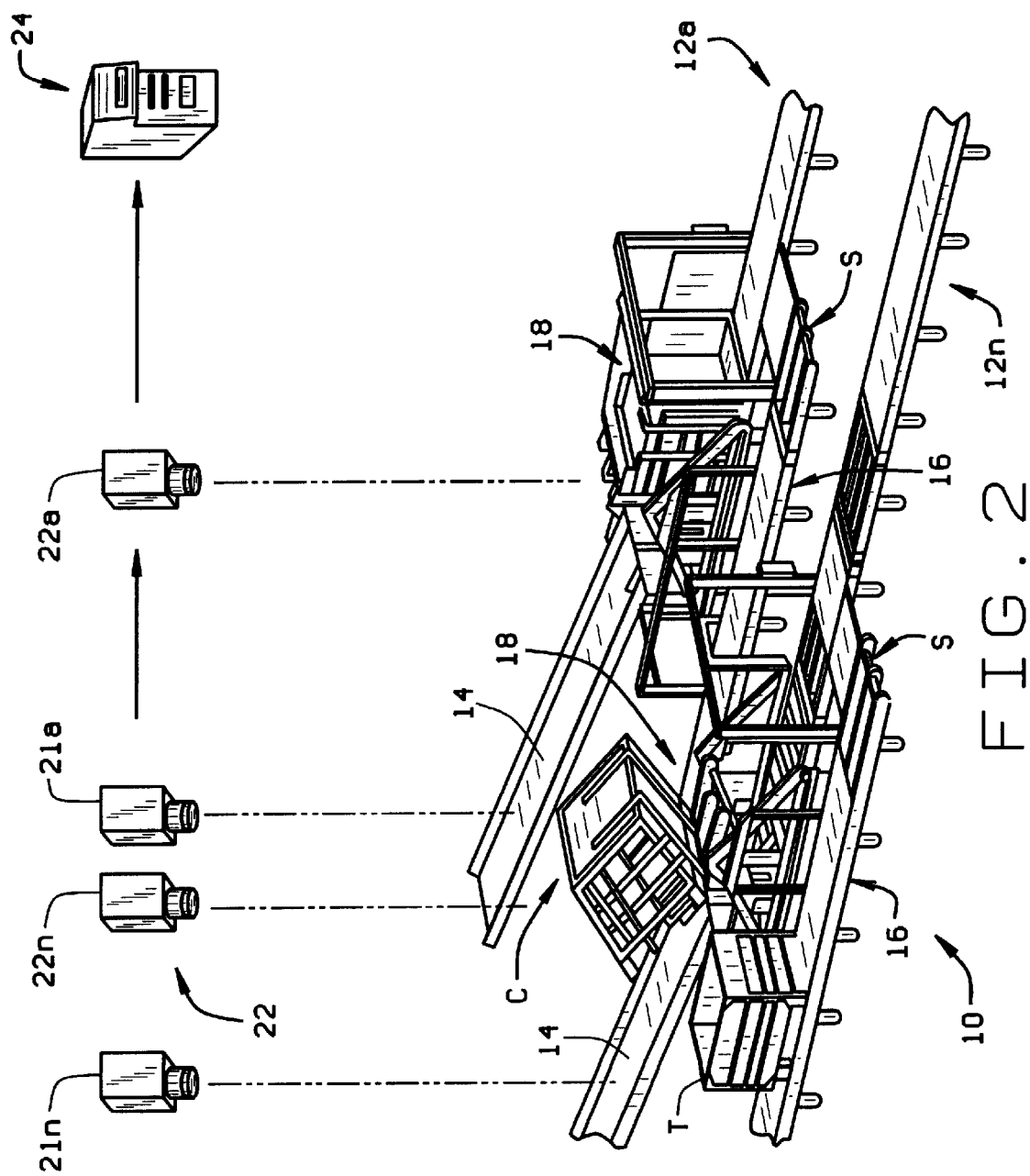

RESIDUAL MAIL DETECTION AND CONTAINER ALIGNMENT VERIFICATION AND METHOD

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to mail processing, and more particularly, to an image processing system which first verifies the alignment of a bulk mail container to a conveyance moving the mail to an unloading site at which the container is emptied and then, second, determines that the container is either empty and so can be removed from the unloading site, or detects leftover (residual) mail remaining in a container for the container to again be emptied in an attempt to remove the residual mail pieces.

A substantial amount of mail is bulk shipped. That is, a large volume of mail, advertising pieces, for example, is identical except for the name of the addressee to whom it is being sent. Such mailings are placed in large containers for delivery to bulk mail centers operated by the Postal Service and at which the mail is processed. Currently, a manual process is employed at these centers to unload the containers so the pieces can be processed for delivery. Automating this process would both reduce the time and costs of processing bulk mailings. However, automation creates other problems which must be resolved for successful implementation.

An automated system would involve placing bulk mail containers on a conveyor with the containers being conveyed from a loading station to an emptying (dumping) site at which the bulk mail containers are tipped over or inverted. After unloading, the bulk mail containers are moved back onto the conveyor system for transport to another station where they are removed for their next usage. Two problems arise in implementing this system.

First, a container must be properly realigned with the conveyor on which it travels so as to readily move through the system, and particularly that it be oriented with respect to a dumping mechanism used to empty the container of its contents. It will be understood that there are a number of different size containers (approximately seven) which the system must accommodate. The system must therefor insure that regardless of the bulk shipping container employed, it is aligned with the conveyor system prior to moving the container along the conveyor. Otherwise, the containers will move properly along the conveyor, jams will occur, containers may be improperly dumped, etc.

Second is insuring that when the container is emptied, all of the mail pieces have fallen from the container and there are no "residual" mail pieces left in the container. Recognizing the presence of residual mail pieces allows enables the container to be kept in place so the residual pieces of mail can be removed, rather than the container being automatically moved away from the unloading site. All pieces of mail will therefore be kept in the system and delivered, and no pieces will be lost. Even if a container must be emptied by hand, the system will require much less manual labor since each container is remotely inspected and those containers having residuals readily identified. As described hereinafter, however, the system attempts to dump these pieces from these containers automatically so substantially no manual labor is required.

BRIEF SUMMARY OF THE INVENTION

Among the several objects of the present invention may be noted the provision of a bulk mail processing system and an imaging system for use therewith to check alignment of containers with a conveyor and to determine if bulk mail containers are completely unloaded after dumping or if residual pieces of mail remain therein;

the provision of such a bulk mail processing system to facilitate processing of bulk mail and thereby reduce the cost of its processing and delivery and of the imaging system to enhance the system's operational efficiency;

the provision of such a system to first view bulk mail containers placed on a conveyor to verify their alignment with the conveyor;

the provision of such an image processing system to later view an emptied container to determine that no mail is left in it; or, if there is residual mail left in the container, that the container is re-emptied to remove the residual mail pieces;

the provision of the image processing system to use a pair of cameras to obtain an image of a "loaded" container when it is first placed on the conveyor, and of the "unloaded" container after it has been emptied;

the provision of such an image processing system to simultaneously monitor a plurality of conveyor lines over which bulk mail containers are conveyed;

the provision of such an image processing to provide "real time" residual mail and container alignment information to a controller for the conveyor system so that bulk mail containers are properly routed through the system; and, the provision of such an image processing system to use "off the shelf" components whereby the system is not only low in cost, but is readily expandable as more bulk processing conveyor lines are implement at a processing center.

In accordance with the invention, generally stated, a bulk mail processing system conveys bulk mail containers from a receiving station at which the container is placed on the conveyor to a station at which the contents of the container are emptied. Apparatus for monitoring the container comprises a video camera or other means for viewing the container and the its contents. A first camera obtains an image of the container when placed on the conveyor at the receiving station. The resulting image is processed to determine proper alignment of the container with the conveyor. A second camera obtains an image of the container after it has been emptied to determine if the container is completely empty, or if it contains residual pieces of mail. The respective images obtained by the cameras are transmitted to a processor which processes the images to determine alignment and verify if the container is empty or not. An unloading mechanism at the emptying station first removes the container from the conveyor, inverts the container for its contents to spill out, returns the container back to its upright position, and replaces the conveyor back onto the conveyor. A controller for the mechanism is responsive to an input from the processor that all the contents of a container have been emptied to have the mechanism replace the empty container on the conveyor. However, the controller is further responsive to an input from the processor that there is residual mail left in the container to re-invert the container to empty the remaining contents of the container so the container is completely empty before being returned to the conveyor. Other objects and features will be in part apparent and in part pointed out hereinafter.

BRIEF DESCRIPTION OF THE SEVERAL VIEWS OF THE DRAWINGS

In the drawings,

FIG. 2 is a perspective view of a portion of the installation;

Corresponding reference characters indicate corresponding parts throughout the drawings.

DETAILED DESCRIPTION OF THE INVENTION

Figure 1:
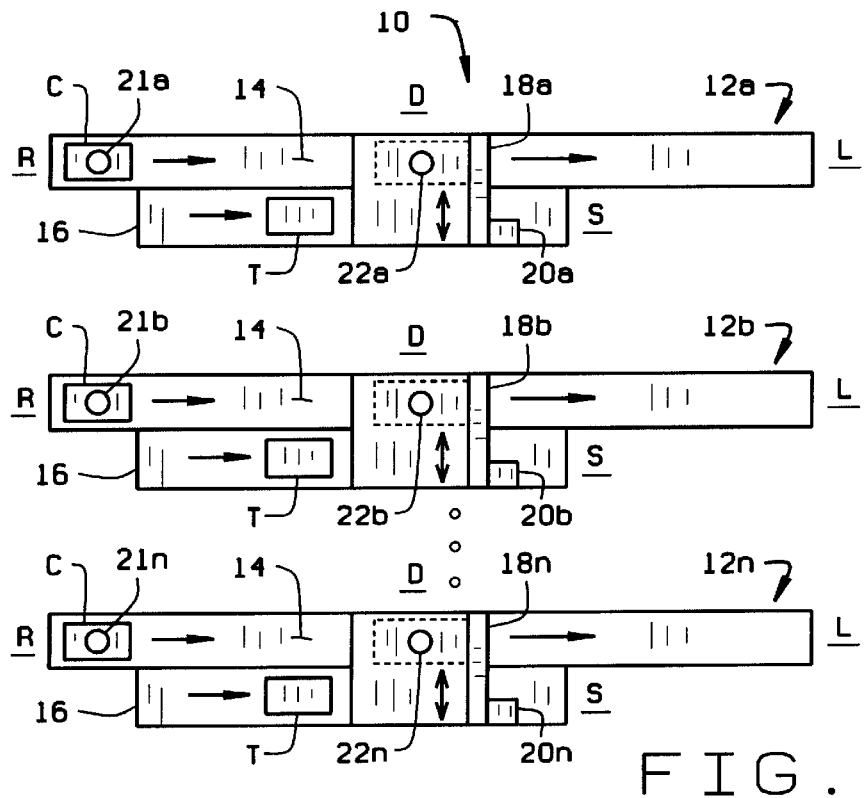
FIG. 1 represents a bulk mail handling installation.

Referring to FIGS. 1 and 2, a bulk mail processing facility is indicated generally 10. The facility typically includes a plurality of conveyors 12a–12n. Mail for bulk processing is delivered to the facility in a container C which may be one of a number of containers of different sizes depending upon the quantity of mail pieces, their size, weight, etc. The container is placed on a first conveyor section or ramp 14 at a receiving station R. The container then moves along section 14 from the receiving station to a container emptying, unloading, or dumping station D at which the container contents are emptied into a standard sized mail receptacle T used by the Postal Service within the facility. After being filled with the contents of container C, receptacle T is moved along a separate conveyor section 16 to a pick-up station S where it is picked up and taken to a processing site for sorting. By offloading the contents of the different size containers C into a standard receptacle T, fork lifts or other means of conveyance can be readily used. Container C is meanwhile removed to an off-loading site L at the end of conveyor 12.

An unloader mechanism 18, which is well-known in the art and will not therefore be described in detail, operates to first lift a container C from conveyor section 14 and move it laterally from conveyor section 14 to conveyor section 16. Then, as shown in FIG. 2, the unloader mechanism rotates the container to an inverted position with the contents of the container emptying into receptacle T. The mechanism then returns the container to its upright position, and replaces the container back onto conveyor 12 for the container to be conveyed to station L. Each conveyor has its own unloader mechanism 18a–18n, and each unloader mechanism has an associated controller 20a–20n.

Figure 5A:
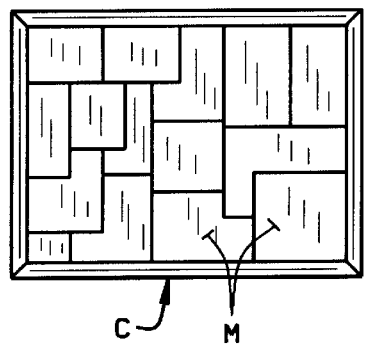
FIG. 5A is a representation of a filled bulk mail container.
Figure 5B:
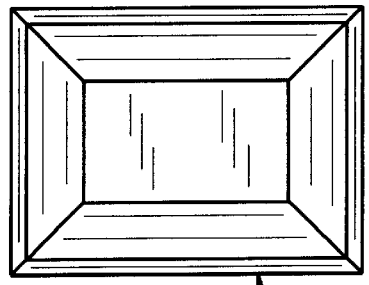
FIG. 5B is a representation of the container after it has been emptied.
Figure 5C:
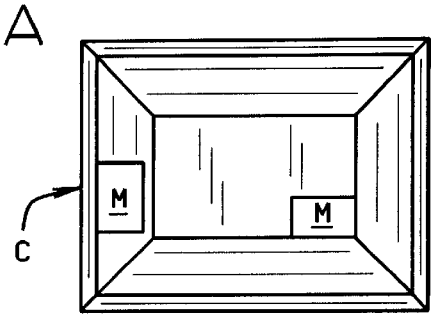
FIG. 5C illustrates a container with residual mail.

FIGS. 5A–5C illustrate a container C. The container shape shown is exemplary only. The sender loads pieces M of mail for bulk mail processing into the container for delivery to facility 10 (FIG. 5A). Typically, when the container is emptied all of the mail pieces fall out of the container into receptacle T so the container, when returned to its upright position appears as shown in FIG. 5B. Occasionally, one or more pieces M of mail stick to the sides or bottom of the container as shown in FIG. 5C and are not dislodged by the inversion of the container. The apparatus now described detects when this occurs and controls operation of mechanism 18 to attempt to dislodge the pieces rather than allowing the container to be conveyed away from station D with mail in it.

The apparatus of the present invention has an imaging means including a first camera 21a–21n located at receiving station R of a conveyor, and another camera 22a–22n at emptying station D. All the cameras are preferably color cameras. Each camera is also installed above its associated conveyor so to look downward at a container placed on the conveyor. A camera 21 views a container C when the container is placed on the conveyor at receiving station R. Camera 22 views the container after it is unloaded to see if the container is completely empty or includes residual mail pieces.

Figure 3:
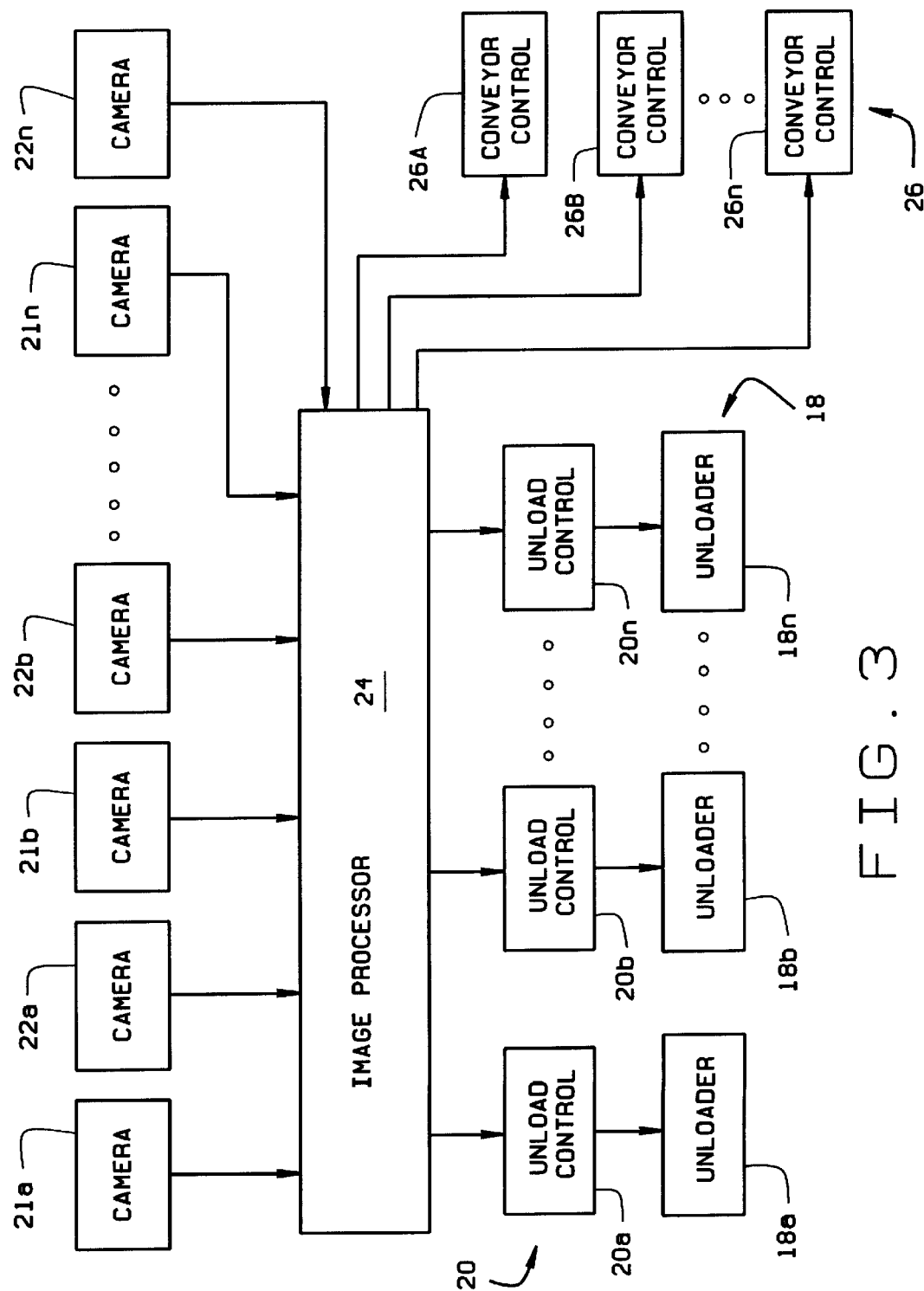
FIG. 3 is a block diagram of the apparatus of the present invention for detecting residual mail.

Images obtained by each camera are transmitted to a processor indicated generally 24. There may be a separate processor for use with each camera; or, the processor is a central processor which operates with all of the cameras. Similarly, while separate controllers 20 are shown for the unloading mechanisms, a central controller operating all of the mechanisms 18 could also be used. As shown in FIG. 3, the processor receives inputs from each of the cameras and provides an output to each unloader mechanism controller 20a–20n.

Figure 4:
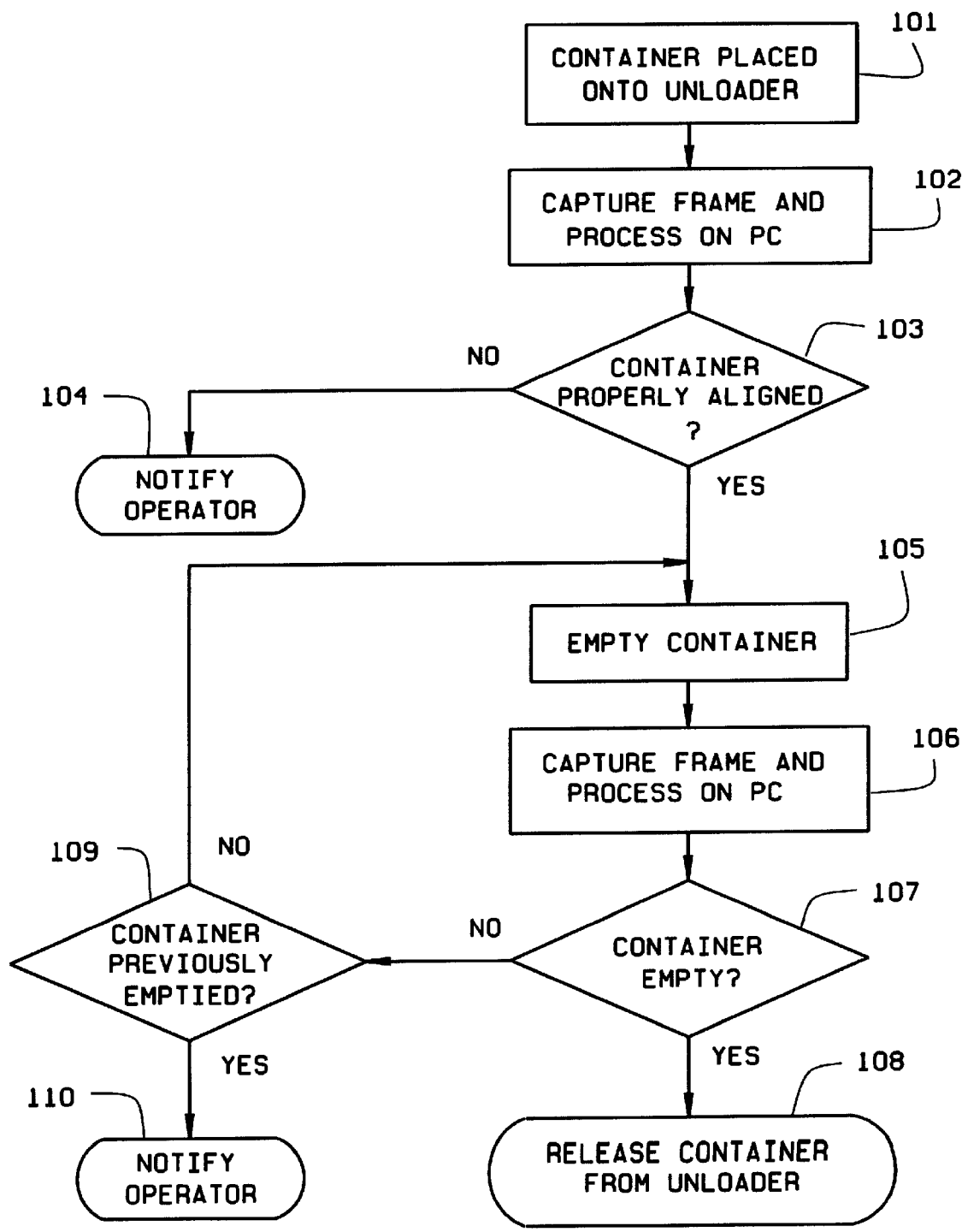
FIG. 4 is a flow diagram of the operation of the apparatus.

Referring to FIG. 4, the first step in the bulk container unloading operation is placing a container C on the conveyor at receiving station R as indicated by step 101. A camera 21 obtains an image of the container, which image is sent to and processed by processor 24. This is step 102. The processed image is evaluated, as indicated at step 103, to determine that the container has mail pieces in it, and that the container is properly aligned on the conveyor. Proper alignment is important so that when the container reaches the unloading station, mechanism 18 can seize the container and perform those operations previously described. If the container is not in alignment with the conveyor, or if the container is empty, processor 18 will inhibit operation of a conveyor control 26, the conveyor will not start, and as indicated at step 104, an operator is notified. If the processed image indicates proper alignment, processor 24 commands a conveyor control 26 for the conveyor to start and move the container to its unloading point.

At station D, mechanism 18 unloads the container into the receptacle as shown in FIG. 2. This is step 105. When the container is returned to its original, upright position, camera 22 obtains another image of the container. The captured frame is sent to processor 24, as indicated at step 106, and processed to determine if the container is empty or contains residual mail. As indicated at step 107, if the container is empty, it is released (step 108) back to the conveyor and conveyed away from the unloading station. If the image processing reveals residual contents in the container, then at step 109, it is determined whether or not the container has been previously emptied. If not, then steps 105–107 are repeated. If the container is now empty, the container is released back to the conveyor per step 108. If the processed image still reveals residual mail, step 109 is repeated. However, since the container has previously been emptied, the conveyor operator is notified as indicated at step 110. The operator will now remove the container, empty it by hand of the residual mail, and then either return it to the conveyor or otherwise return the container to the end of the conveyor for further use.

With respect to steps 105–110, in this process, the container is only dumped twice before an operator is notified and the container emptied by hand. It will be understood, that the process could employ more than two dumps before notifying the operator without departing from the scope of the invention.

What has been described is an imaging system for use in a bulk mail processing system. The apparatus employs an imaging system to determine alignment of bulk mail containers to a conveyor, and if the containers are completely unloaded after dumping, or if residual pieces of mail remain in the containers. Bulk mail containers are first viewed to verify alignment. After unloading, the container is again viewed again to verify that all the mail pieces have been dumped from the container or if pieces remain. The imaging system simultaneously monitors a number of separate conveyor lines over which bulk mail containers are conveyed, and provides "real time" residual mail and container alignment information to conveyor system controllers which keep the bulk mail containers moving through the system. Off-the-shelf components are used to construct the system, so the system is not only low cost but also readily expandable.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

What is claimed is:

1. In a bulk mail processing system in which a bulk mail container is conveyed from a receiving station to an unloading station at which the contents of the container are emptied out of the container, apparatus for monitoring the container comprising:

emptying means at the unloading station emptying the contents of the container;

imaging means viewing the container after it has been emptied;

a processor to which the image is transmitted by the imaging means, the processor processing the image to determine if the container has been fully emptied or if any residual pieces of mail remain therein; and, a controller controlling operation of the emptying means and responsive to an input from the processor that the container has been emptied to have the empty container conveyed away from the unloading station, the controller being further responsive to an input from the processor that there is residual mail left in the container to have the emptying means re-empty the container to unload the remaining contents of the container so the container is completely empty before being conveyed from the unloading station.

2. The apparatus of claim 1 wherein the imaging means obtains an image of the interior of the container each time the emptying means unloads, and the processor processes each image to determine if the container is empty or contains residual, the processor commanding the controller to have the emptying means empty the container a predetermined number of times before having container set aside to be otherwise emptied of residual mail remaining therein.

3. The apparatus of claim 1 wherein the bulk mail processing system includes a conveyor on which the container is moved to and from the unloading station and the imaging means includes means viewing the container when placed on the conveyor at the receiving station to ascertain alignment of the container with the conveyor before the container is conveyed to the unloading station.

4. The apparatus of claim 3 wherein the imaging means includes a first camera positioned at the receiving station to obtain a first image of the container, and a second camera at the unloading station to obtain a second image of the container.

5. The apparatus of claim 4 wherein the emptying means includes an unloading mechanism which removes the container from the conveyor, inverts the container to empty its contents, returns the container to its upright position, and replaces the empty container on the conveyor.

6. The apparatus of claim 5 wherein the imaging means obtains an image of the container's interior after the emptying means has emptied the container, the processor providing an input to the controller to have the container replaced on the conveyor only if the processor determines that the container is empty.

7. The apparatus of claim 6 wherein if the processor determines there is residual mail remaining in the container after the container has been emptied, the processor transmits a signal to the controller means to have the emptying means re-invert the container to empty the container of its residual contents.

8. The apparatus of claim 7 wherein the imaging means obtains an image of the interior of the container each time the emptying means returns the container to its upright position, the processor sending a signal to the controller to have the emptying means re-invert the container so long as the processed image indicates residual mail in the container.

9. The apparatus of claim 8 wherein the processor sends a signal to the controller to have the emptying means re-invert the container if the processed image indicates residual mail in the container after the first time the container is emptied, but a different signal to the controller if the processed image indicates residual mail in the container after the second time the container is emptied, the controller being responsive to this different signal to set the container aside so it can be otherwise emptied of the residual mail remaining therein.

10. The apparatus of claim 3 further including a plurality of conveyors on which respective containers are moved to and from an unloading station, and the emptying means includes means along each conveyor for removing the container from conveyor, inverting the container to empty its contents, and then returning the container to its original position and replacing it on the conveyor for the container to be conveyed from the unloading station.

11. The apparatus of claim 10 further including a separate imaging means for each conveyor to obtain a first image of the container to verify alignment of the container with the conveyor, and a second image of the container after the container is emptied, images obtained by each imaging means being transmitted to a central processor for processing.

12. The apparatus of claim 11 further including a controller for each emptying means, each controller being responsive to an input from the processor that a container has been emptied to have the empty container conveyed from the unloading station, the controller being further responsive to an input from the processor that there is residual mail left in the container to have the emptying means re-empty the container so the container is completely empty before being conveyed from the unloading station.

13. The apparatus of claim 11 further including a central controller for the emptying means on the conveyors and responsive to an input from the processor that a container on one of the conveyors has been emptied to have the empty container conveyed from the unloading station on that conveyor, the central controller being further responsive to an input from the processor that there is residual mail left in the container to have the emptying means empty the remaining contents of the container so the container is completely empty before being conveyed from the unloading station on that conveyor.

14. A bulk mail processing system comprising:
a conveyor on which a container containing bulk mail is conveyed from a receiving station to a dumping station at which the contents of the container are emptied out of the container which is then conveyed away from the dumping station;
an imaging means viewing the container and the contents thereof;
emptying means at the dumping station emptying the contents out of the container for the container to be emptied, the emptying means removing the container from the conveyor, inverting the container to empty its contents, and then returning the container to its original position and replacing it on the conveyor for the container to be conveyed from the dumping station;
a processor to which an image of the container is transmitted by the imaging means, the processor processing the image to determine if the container has been emptied or if any residual pieces of mail remain therein; and,
control means controlling operation of the emptying means and responsive to an input from the processor that the container has been emptied to have the empty container conveyed from the dumping station, the control means being further responsive to an input from the processor that there is residual mail left in the container to have the emptying means empty the remaining contents of the container so the container is completely empty before being conveyed from the dumping station.

15. The bulk mail processing system of claim 14 wherein the imaging means obtains an image of the container's interior after the emptying means has emptied the container, the processor providing an input to the control means to have the container conveyed from the dumping station only if the processor determines that the container is empty.

16. The bulk mail processing system of claim 15 wherein if the processor determines there is residual mail remaining in the container after the container has been emptied, the processor transmits a signal to the control means to have the emptying means re-invert the container to empty the container of its residual contents.

17. The bulk mail processing system of claim 16 wherein the processor sends a signal to the control means to have the emptying means re-invert the container if the processed image indicates residual mail in the container after the first time the container is emptied, but a different signal to the control means if the processed image indicates residual mail in the container after the second time the container is emptied, the control means being responsive to this different signal to set the container aside so it can be otherwise emptied of the residual mail remaining therein.

18. The bulk mail processing system of claim 17 further including a plurality of conveyors on which respective containers are moved to and from a dumping station, and the emptying means includes means along each conveyor for removing the container from conveyor, inverting the container to empty its contents, and then returning the container to its original position and replacing it on the conveyor for the container to be conveyed from the dumping station.

19. The bulk mail processing system of claim 18 further including a separate imaging means for each conveyor to obtain an initial image of the container to verify the container is aligned with the conveyor before being moved therealong, and an image of the container after it is emptied to verify the container holds no residual mail, images obtained by each imaging means being transmitted to a central processor for processing.

20. The bulk mail processing system of claim 19 further including a central control means operating the respective emptying means along each conveyor.

21. In a bulk mail processing system in which a bulk mail container is conveyed from a receiving station to an unloading station at which the container is emptied of its contents with the container then being conveyed away from the unloading station, the system including apparatus positioned at the unloading station for emptying the container and a controller controlling operation of the apparatus, the improvement comprising:
imaging means at the unloading station obtaining an image of the container after the container is emptied; and,
a processor processing the image to determine if the container is empty or if any residual pieces of mail remain therein, the processor providing one input to the controller if the container is empty to have the empty container conveyed from the unloading station, but another input to the controller if the processor determines there is residual mail in the container, the controller being responsive to the second said input from the processor to have the container emptying apparatus again empty the contents of the container to remove any pieces of residual mail therefrom.

22. The improvement of claim 21 wherein the imaging means further obtains an image of the container prior to the container being conveyed from the receiving station to the unloading station, the processor processing this second said image to determine if the container is properly aligned with the means of conveyance for the container so when the container reaches the unloading station, it can be readily operated on by the container emptying apparatus.

23. The improvement of claim 22 wherein the bulk mail processing system includes a conveyor on which the container is moved to and from the container emptying station, the container emptying apparatus removing the container from conveyor, inverting the container to empty its contents, and then returning the container to its original position and replacing it on the conveyor for the container to be conveyed from the container emptying station, the processor commanding the controller to have the apparatus re-invert the container after it is initially emptied, if residual mail is determined to remain in the container, to empty the residual mail from the container.

24. The improvement of claim 23 further including a plurality of conveyors on which respective containers are moved to and from a container emptying station, and a separate imaging means for each conveyor to obtain an image of the interior of the container moving along each conveyor, images obtained by each imaging means being transmitted to a central processor for processing.

25. The improvement of claim 24 wherein the apparatus includes means along each conveyor for removing the container from each conveyor and emptying the container of its contents, and then returning the container to the conveyor for removal of the container from the container emptying station.

26. A method of bulk mail processing comprising:

conveying a bulk mail container from a receiving station to an unloading station;

emptying the contents of the container by a container emptying mechanism whose operation is controlled by a controller;

obtaining an image of the container after the container has been emptied;

processing the image to determine if the container, after its contents have been emptied, retains any residual pieces of mail;

informing the container emptying mechanism controller if the container still contains residual pieces; and, re-emptying the container using the mechanism to empty the residual pieces of mail from the container.

27. The method of claim 26 further including an image of the container when first placed on a conveyance for moving the container from the receiving station to the unloading station, and processing the image to determine if the container is properly aligned with the container emptying mechanism so when the container reaches the mechanism it can be emptied.

28. The method of claim 27 wherein the bulk mail processing includes conveying the container on a conveyor to the unloading station, removing the container, inverting the container to empty the container of its contents, and returning the empty container to the conveyor only when the processed image indicates the container has no residual mail.

29. The method of claim 28 further including a plurality of conveyors over which bulk mail containers are separately conveyed to respective unloading stations and the method includes obtaining a separate image of each container when it is first placed on a respective conveyor and after the container has been emptied, re-emptying any container found to contain residual mail by processing the image for that particular container, and having a mechanism associated with each separate conveyor to return a container to its respective conveyor only when processing the respective image indicates the container is empty.

30. The method of claim 29 wherein a separate imaging means is used to obtain an image of a container on a respective conveyor, the images obtained by the imaging means being provided to a central processor which processes the images to determine if any container contains residual mail after having been emptied.

31. The method of claim 26 in which a container which still contains residual mail after it has been re-emptied is set aside by the mechanism for further processing to remove the residual mail contents of the container.

* * * * *